United States Patent
Hung et al.

(10) Patent No.: US 9,225,240 B2
(45) Date of Patent: Dec. 29, 2015

(54) CHARGE PUMP UTILIZING EXTERNAL CLOCK SIGNAL

(75) Inventors: Chun-Hsiung Hung, Hsinchu (TW); Chuan-Ying Yu, Zhubei (TW)

(73) Assignee: MACRONIX INTERNATIONAL CO., LTD. (TW)

( * ) Notice: Subject to any disclaimer, the term of this patent is extended or adjusted under 35 U.S.C. 154(b) by 0 days.

(21) Appl. No.: 12/786,122

(22) Filed: May 24, 2010

(65) Prior Publication Data

US 2011/0115551 A1      May 19, 2011

Related U.S. Application Data

(60) Provisional application No. 61/260,965, filed on Nov. 13, 2009.

(51) Int. Cl.
  *G05F 3/02* (2006.01)
  *G05F 1/10* (2006.01)
  *H02M 3/07* (2006.01)

(52) U.S. Cl.
  CPC .................................... *H02M 3/073* (2013.01)

(58) Field of Classification Search
  CPC . H02M 3/073; H02M 3/07; H02M 2003/077; G11C 5/145; G05F 3/205
  USPC ........................................ 327/536; 363/59–60
  See application file for complete search history.

(56) References Cited

U.S. PATENT DOCUMENTS

| | | | |
|---|---|---|---|
| 5,446,697 A * | 8/1995 | Yoo et al. ....................... | 365/226 |
| 5,726,944 A | 3/1998 | Pelley, III et al. | |
| 5,985,709 A | 11/1999 | Lee et al. | |
| 6,249,445 B1 * | 6/2001 | Sugasawa ....................... | 363/60 |
| 6,493,276 B2 | 12/2002 | Lin et al. | |
| 6,518,828 B2 | 2/2003 | Seo et al. | |
| 6,573,780 B2 | 6/2003 | Lin et al. | |
| 6,768,366 B2 | 7/2004 | Kuo et al. | |
| 6,847,250 B2 | 1/2005 | Kim | |
| 6,894,554 B2 * | 5/2005 | Ito ................................. | 327/536 |
| 7,046,065 B2 | 5/2006 | Ruat et al. | |
| 7,227,764 B2 | 6/2007 | Chueh et al. | |
| 7,514,984 B2 | 4/2009 | Park et al. | |
| 7,551,507 B2 * | 6/2009 | Nakai et al. .................... | 365/226 |
| 7,595,682 B2 | 9/2009 | Lin et al. | |
| 2005/0093577 A1 * | 5/2005 | Nguyen et al. ................ | 326/105 |
| 2005/0264343 A1 | 12/2005 | Nakamura | |
| 2007/0069800 A1 | 3/2007 | Shih et al. | |
| 2009/0058508 A1 | 3/2009 | Lin | |

* cited by examiner

*Primary Examiner* — Quan Tra
(74) *Attorney, Agent, or Firm* — Baker & McKenzie LLP

(57) ABSTRACT

A method of generating a pumping voltage in an integrated circuit includes receiving an external clock signal from outside of the integrated circuit. The frequency of the received external clock signal is changed according to one or more modulation ratios, resulting in one or more respective modulated external clock signal. The external clock signal or one of the modulated external clock signals is then selected for use as a pump clock signal. The pump clock signal is used for driving the pump capacitance of a pump circuit for generating the pumping voltage.

28 Claims, 5 Drawing Sheets

CHARGE PUMP UTILIZING EXTERNAL CLOCK SIGNAL

RELATED APPLICATION

This application claims the benefit of U.S. Provisional Application No. 61/260,965, filed Nov. 13, 2009, titled "CHARGE PUMP UTILIZING EXTERNAL CLOCK SIGNAL," which is hereby incorporated by reference.

BACKGROUND

1. Technical Field

The present application relates to charge pump circuitry, including charge pump circuitry used in integrated circuits.

2. Related Art

Integrated circuits, sometimes referred to as microchips or semiconductor devices, are in widespread use and can be found in almost all electronic equipment in use today. The packaging of an integrated circuit can vary, but will include at least one contact point, simply referred to herein as a "pin," that allows for electronic communication between circuitry within the integrated circuit and circuitry external to the integrated circuit. A typical integrated circuit will include a pin for receiving an external supply voltage $V_{DD}$ that is predetermined and configured to remain at an at least somewhat constant voltage level during operation.

Some integrated circuits are configured to use a voltage level that exceeds the supply voltage $V_{DD}$ for at least some operations. For example, some integrated circuits are memory devices that use a voltage greater than supply voltage $V_{DD}$ for read and/or write operations. Such integrated circuits will often include a charge pump. A charge pump is a circuit that can provide a voltage that exceeds the supply voltage $V_{DD}$.

For example, FIG. 1 shows a block diagram of voltage pumping circuitry of a conventional integrated circuit 100. The integrated circuit 100 includes a pump circuit 102 and a clock signal circuit 104, which are both internal to the integrated circuit 100. The pump circuit 102 and clock signal circuit 104 receive a supply voltage $V_{DD}$ provided by a power supply external to the integrated circuit 100. The clock signal circuit 104 generates complementary clock signals CLK1 and CLK2 and provides the clock signals CLK1 and CLK2 to the pump circuit 102. The pump circuit 102 receives the supply voltage $V_{DD}$ and the clock signals CLK1 and CLK2 and generates a pumping voltage $V_{PUMP}$ that has a voltage level that exceeds the voltage level of the supply voltage $V_{DD}$. The pumping voltage $V_{PUMP}$ can thus be provided to other circuitry not shown of the integrated circuit 100.

In some cases, the integrated circuit 100 may be a type of integrated circuit that can be used with a variety of different electronic systems. For example, the integrated circuit 100 may be an electronic memory device. The frequency of the clock signals CLK1 and CLK2 affects the performance of the integrated circuit 100 as well as the power consumption of the integrated circuit 100. These affects extend to the performance and power consumption of the electronic system that incorporates the integrated circuit 100. Since the particular frequency of the clock signals CLK1 and CLK2 will depend on the configuration of the clock signal circuit 104, the frequency of the clock signals CLK1 and CLK2 is determined and set during the design and manufacturing of the integrated circuit 100. Thus, the integrated circuit 100 may be less than optimal for some systems.

Also, there are additional drawbacks to including an internal clock generator such as clock circuit 104 in the integrated circuit 100. For example, the internal clock circuitry occupies a large area and has a relatively large peak current.

Thus, it is desirable to find alternative approaches for increasing the flexibility of integrated circuits in order to allow for good performance with a variety of operating environments.

BRIEF DESCRIPTION OF THE DRAWINGS

Features, aspects, and embodiments of the inventions are described in conjunction with the attached drawings, in which.

DETAILED DESCRIPTION

Figure 1:
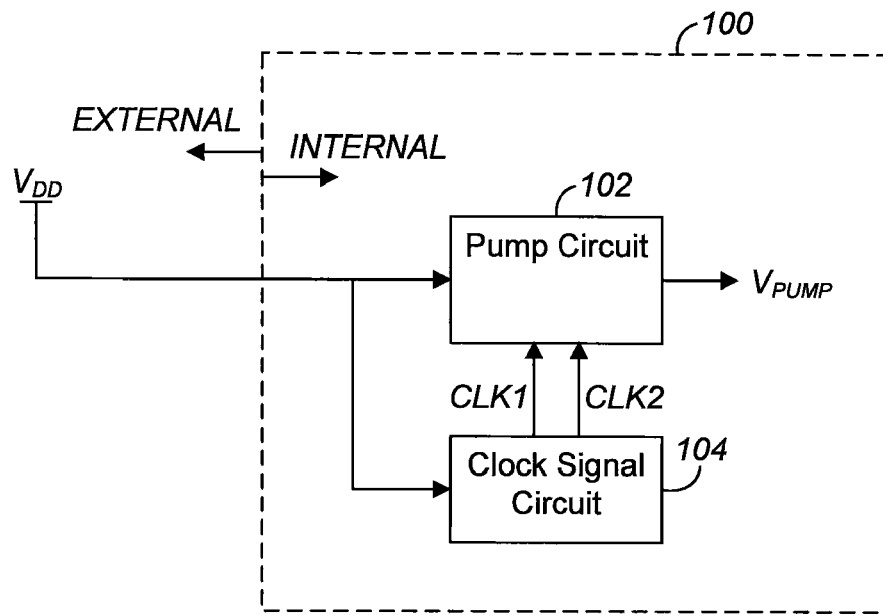
FIG. 1 shows a block diagram of a voltage pumping circuitry of a conventional integrated circuit.
Figure 2:
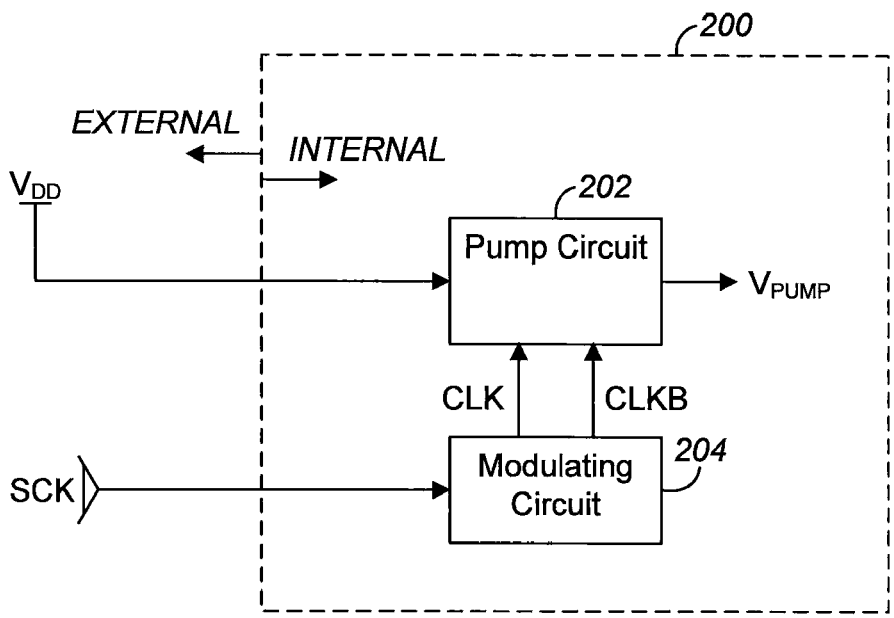
FIG. 2 shows a block diagram of an integrated circuit according to an embodiment of the present disclosure.

FIG. 2 shows a block diagram of an integrated circuit 200 in accordance with one embodiment can include a pump circuit 202 and a modulating circuit 204.

The modulating circuit 204 can be configured such that it receives a system clock signal SCK from a source that is external to the integrated circuit 200. The modulating circuit 204 can be configured such that the system clock signal SCK is selectively modulated and output as clock signals CLK and CLKB.

The pump circuit 202 can be configured such that it receives the clock signals CLK and CLKB and a supply voltage $V_{DD}$. The pump circuit 202 can be configured such that the supply voltage $V_{DD}$ and clock signals CLK and CLKB are used to generate a pumping voltage $V_{PUMP}$. The pump circuit 202 can be configured such that the pumping voltage $V_{PUMP}$ has a voltage level that is greater than that of the supply voltage $V_{DD}$. The supply voltage $V_{DD}$ can be provided from a source that is external to the integrated circuit 200 as shown, or can be provided from a source that is internal to the integrated circuit 200.

Figure 3:
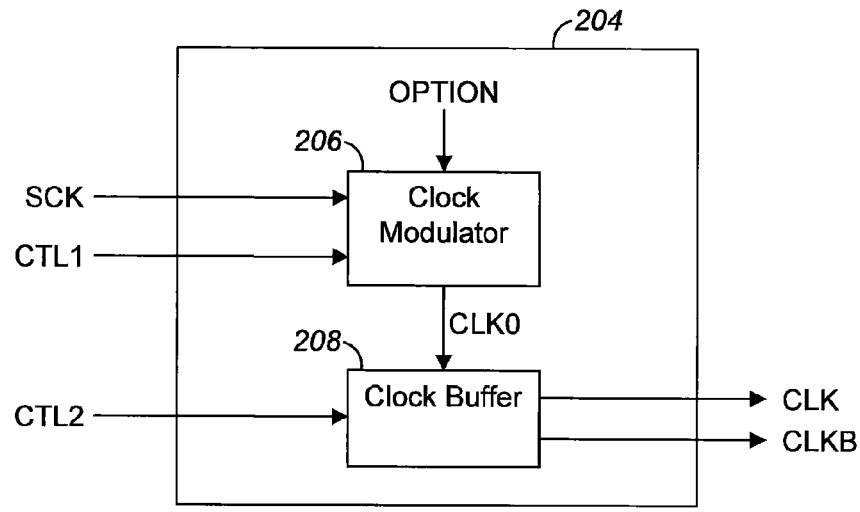
FIG. 3 shows a block diagram of modulating circuit that can be used with the integrated circuit shown in FIG. 2.

FIG. 3 shows a block diagram of a modulating circuit 204 according to one embodiment. The modulating circuit 204 can include a clock modulator 206 and a clock buffer 208.

The clock modulator 206 can be configured to receive the system clock signal SCK that was received by the integrated circuit 200 from a source external to the integrated circuit 200. The clock modulator 206 can also be configured to receive a first control signal CTL1 and a selector signal OPTION. The clock modulator 206 can be configured such that the system clock signal SCK is modulated according to one of a plurality of modulation ratios depending on the selector signal OPTION and then output as modulated clock signal CLK0. The clock modulator 206 can be configured to be enabled or disabled depending on the first control signal CTL1.

The clock buffer 208 can be configured to receive the modulated clock signal CLK0 and a second control signal CTL2. The clock buffer 208 can be configured to output first and second pump clock signals CLK and CLKB. The clock buffer 208 can be configured to be enabled or disabled depending on the second control signal CTL2. The clock buffer 208 can be configured such that the first pump clock signal CLK is substantially the same as the modulated clock signal CLK0 and the second pump clock signal CLKB is substantially the same as an inverse of the modulated clock signal CLK0. In other words, the first and second pump clock signals CLK and CLKB can be complementary clock signals such that the first pump clock signal CLK is 180 degrees out of phase with the second pump clock signal CLKB. In some embodiments, the phase difference between the first and second pump clock signals CLK and CLKB can be a phase difference other than 180 degrees.

In some embodiments, the clock buffer 208 can be configured to output only a single pump clock signal CLK having a frequency that is substantially the same as the modulated clock signal CLK0. In some embodiments, the clock buffer 208 can be configured to output more than two pump clock signals. In some such embodiments, one or more of the pump clock signals can have a frequency that is substantially the same as the modulated clock signal CLK0, and two or more of the pump clock signals can be out of phase with each other. The clock buffer 208 can be configured to provide one or more pump clock signals according to the configuration of the pump circuit 202.

Figure 4:
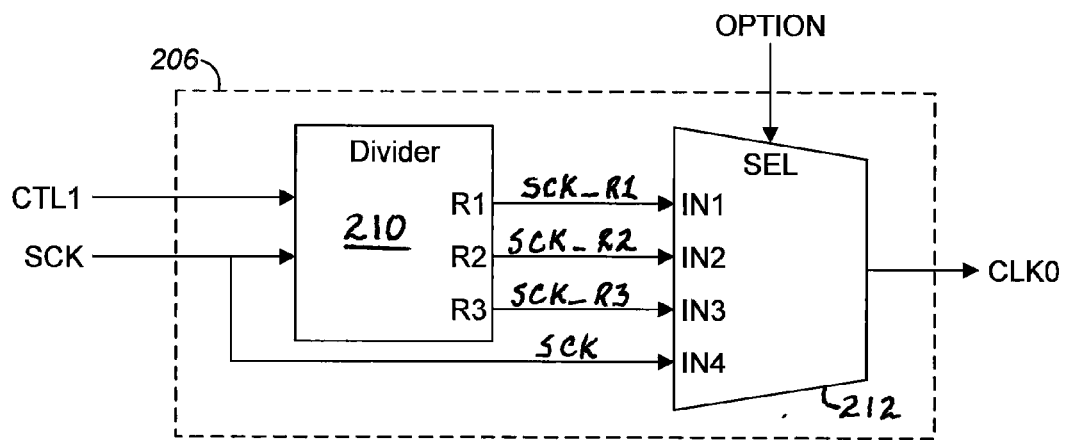
FIG. 4 shows a block diagram of a clock modulator that can be used with the modulating circuit shown in FIG. 3.

FIG. 4 shows a block diagram of a clock modulator 206 according to one embodiment. The clock modulator 206 can include a clock divider 210 and a multiplexer 212.

The clock divider 210 can be configured to receive the first control signal CTL1 and the system clock signal SCK. The clock divider 210 can be configured to modulate the frequency of the system clock signal SCK according to a plurality of modulation ratios R1, R2, and R3. The clock divider 210 can be configured to output a first modulated clock signal SCK_R1 that has been modulated according to the modulation ratio R1, a second modulated clock signal SCK_R2 that has been modulated according to the modulation ratio R2, and a third modulated clock signal SCK_R3 that has been modulated according to the modulation ratio R3. The clock divider 210 can be configured to be enabled or disabled depending on the first control signal CTL1.

The clock divider 210 can be configured to modulate the system clock signal SCK according to modulation ratios R1, R2, and R3 that are selected according to modulation ratios that are considered to be candidates for providing optimal operation and/or other design criteria. For example, in some embodiments, the modulation ratios can be $R1=1/2$, $R2=1/4$, and $R3=1/8$. In such embodiments, the frequency of the first modulated clock signal SCK_R1 will be ½ the frequency of the system clock signal SCK, the frequency of the second modulated clock signal SCK_R2 will be ¼ the frequency of the system clock signal SCK, and the frequency of the third modulated clock signal SCK_R3 will be ⅛ the frequency of the system clock signal SCK. Alternatively, the modulation ratios can be any desired ratios $1/x$, where x can be greater than or less than zero. For example, in some embodiments, one or more of the modulation ratios can be greater than one, so that the frequency of the system clock signal SCK is increased instead of divided. For example, in some such embodiments, the modulation ratios can be $R1=1/2$, $R2=2$, and $R3=4$.

While the clock divider 210 is shown and described as being configured to modulate the frequency of the system clock signal SCK according to three modulation ratios, alternative embodiments of the clock divider 210 can be configured to modulate the frequency of the system clock signal SCK according to one, two, or more than three modulation ratios and output the resulting modulated clock signals.

The multiplexer 212 can be configured to receive the modulated clock signals SCK_R1, SCK_R2, and SCK_R3, and the system clock signal SCK as input signals IN1, IN2, IN3, and IN4, respectively. The multiplexer 212 can be configured to receive the selector signal OPTION. The multiplexer 212 can be configured to output one of the input signals IN1-IN4 as the output modulated clock signal CLK0 depending on the selector signal OPTION.

In some embodiments, the multiplexer 212 can be configured to select one of the input signals IN1-IN4 depending on a voltage level of the selector signal OPTION. In some embodiments, the selector signal OPTION can include one or more bits of data provided via one or more data lines, and the multiplexer 212 can be configured to select one of the input signals IN1-IN4 according to the data provided as the selector signal OPTION.

In some embodiments, the selector signal OPTION can depend on the state of one or more metal options, poly fuse options, and/or programmable fuses. During a design phase of the integrated circuit 200, the designer can select a clock frequency based on a simulation model. For example, the selected clock frequency can be the same as the system clock frequency SCK or a ratio $R1=1/x$ of the expected system clock frequency SCK. However, once the integrated circuit 200 is actually manufactured, the performance of the integrated circuit 200 and/or the system clock frequency may not be the same as was expected based on the simulation model. Thus, the designer can reserve one or more options corresponding to the other available modulation ratios (e.g., modulation ratios R1, R2, and/or R3). The integrated circuit 200 can thus be fine-tuned by programming the selector signal OPTION to correspond to a desired one of the input signals IN1, IN2, IN3, or IN4.

Figure 5:
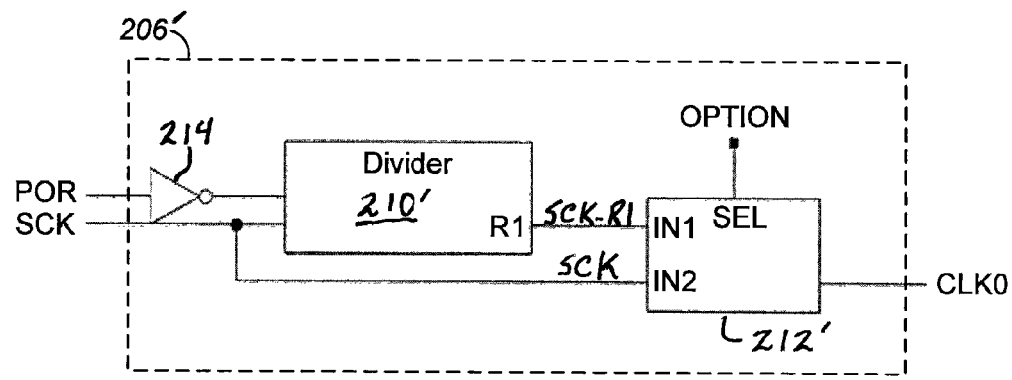
FIG. 5 shows a block diagram of an alternative clock modulator that can be used with the modulating circuit shown in FIG. 3.

FIG. 5 shows a block diagram of a clock modulator 206' according to an alternative embodiment of the clock modulator 206. The clock modulator 206' can be used for embodiments where the integrated circuit 200 is a memory device, for example, a flash memory device. The clock modulator 206' can include a clock divider 210', which serves as an alternative embodiment of the clock divider 210, and a multiplexer 212', which serves as an alternative embodiment of the multiplexer 212.

The clock divider 210' can be configured to receive a Power-On Reset signal POR, which serves as an example of the first control signal CTL1. The Power-On Reset signal POR a signal that indicates that the integrated circuit 200 is in reset phase, during which the system clock signal is not desired. The clock divider 210' can be configured to be enabled depending on the value of the Power-On Reset signal POR such that the clock divider can be disabled during the reset phase by the Power-On Reset signal POR. Other aspects of the clock divider 210' can be the same as clock divider 210. The clock divider 210' shows an example of a divider that is configured to modulate the frequency of the system clock signal SCK according to a single modulation ratio R1, and output the thus modulated clock signal as modulated clock signal CLK_R1. However, alternatively the clock divider 210' can be configured to modulate the frequency of the system clock signal SCK according to a plurality of modulation ratios and output the resulting modulated clock signals as described in connection with the clock divider 210.

The multiplexer 212' can be configured according to the description of the multiplexer 212. The primary difference between the multiplexer 212 and the alternative multiplexer 212' is that the multiplexer 212' is configured to receive only two input signals since the clock divider 210' is only outputting a single modulated clock signal CLK_R1. Thus, the multiplexer 212' is configured to input a selected number of signals according to the configuration of the clock divider 210'.

The clock modulator 206' can also be configured to include an inverter 214 such that an indication of reset phase can be inverted to accommodate the design logic of the divider 210'. Thus, the inverter 214 is optional and can be included depending on the logic design of the integrated circuit 200 and the divider 210'.

Figure 6:
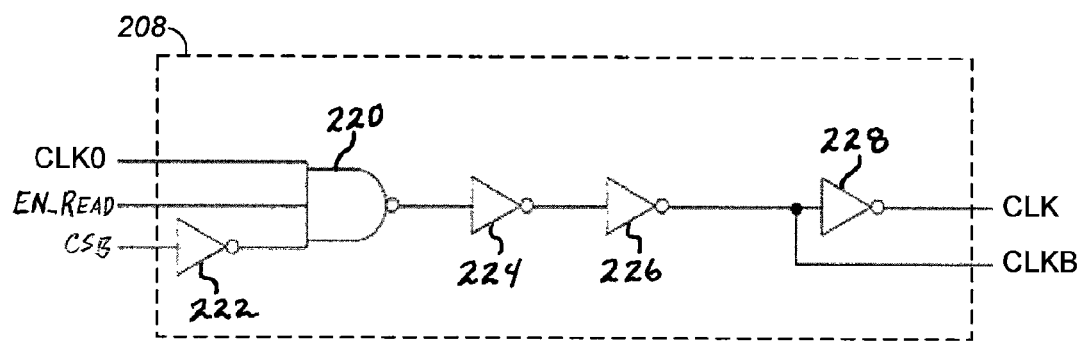
FIG. 6 shows a block diagram of a clock buffer that can be used with the modulating circuit shown in FIG. 3.

FIG. 6 shows a block diagram of a clock buffer 208 according to one embodiment. The clock buffer 208 can include a NAND gate 220, and first through fourth inverters 222, 224, 226, and 228.

The clock buffer 208 can be configured to receive the modulated clock signal CLK0. The clock buffer 208 can also be configured to receive a read enable signal EN_READ and a chip select signal CSB. The read enable signal EN_READ and chip select signal CSB serve as examples of control signals, shown generally as the second control signal CTL2 in FIG. 3. The clock buffer 208 can be configured to output the modulated clock signal CLK0 as first pump clock signal CLK, and output an inverse of the modulated clock signal CLK0 as second pump clock signal CLKB. The clock buffer 208 can be configured to only output the first and second pump clock signals CLK and CLKB when enabled by the control signals EN_READ and CSB.

The clock buffer 208 can be configured to be enabled or disabled depending on the values of a read enable signal EN_READ and a chip select signal CSB for embodiments where the integrated circuit is a flash memory device. For example, the integrated circuit 200 can be a flash memory device that is configured such that the chip select signal CSB=0 and read enable signal EN_READ=$V_{DD}$ is indicative of the desire to operate the pump circuit 202 for a read operation. Thus, when the pump circuit 202 is to activated, the chip select signal CSB=0 so the inverter 222 provides a high level signal to the NAND gate 220, and the read enable signal EN_READ=$V_{DD}$ so another high level signal is provided to the NAND gate. When the NAND gate 220 receives these two high level signals, the output of the NAND gate 220 will follow the inverse of the modulated clock signal 220.

Alternative control signals can be used for other types of integrated circuits and in alternative embodiments of the clock buffer 208 used in a flash memory device. In some embodiments, the NAND gate 220 can be omitted where control for enabling and disabling of the clock buffer 208 is not desired.

The inverters 224 and 226 are representative of a timing buffer that can be included in the clock buffer 208 in order to provide for desired timing delays, which will vary depending on the particular circuit design.

The inverter 228 allows the clock buffer 208 to output complementary clock signals. Before the inverter 228, the signal is inverted relative to the modulated clock signal CLK0. This inverted signal is output from the clock buffer 208 as the second pump clock signal CLKB. The inverter 228 inverts the signal to be substantially the same as the modulated clock signal CLK0 and this signal is output from the clock buffer 208 as the first pump clock signal CLK.

Figure 7:
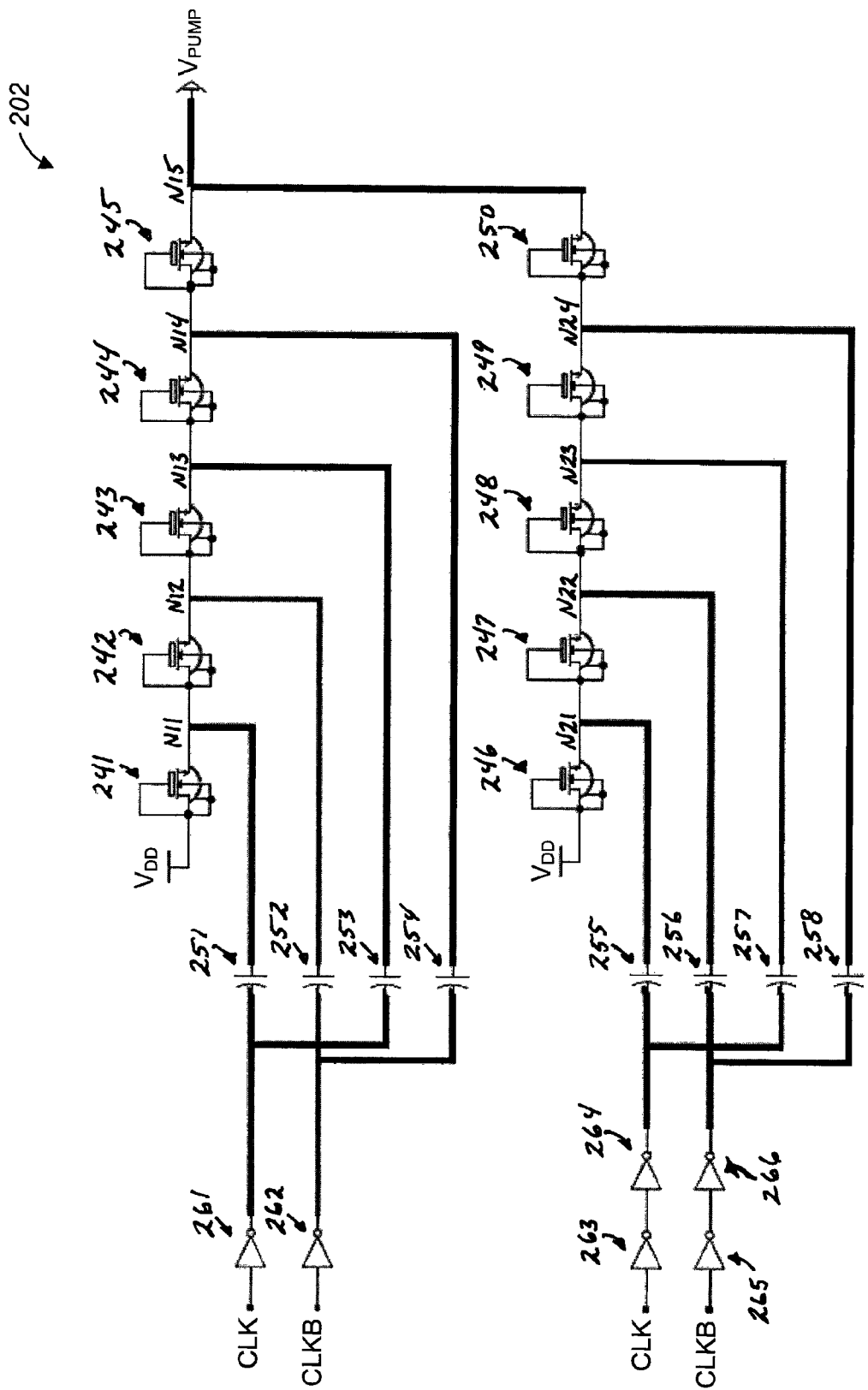
FIG. 7 shows a block diagram of a pump circuit that can be used with the integrated circuit shown in FIG. 2.

FIG. 7 shows a block diagram of a pump circuit 202 according to one embodiment. The pump circuit 202 is a two-stage, two-phase pump that includes first through tenth transistors 241-250, first through eighth capacitors 251-258, and first through sixth inverters 261-266.

The pump circuit 202 can be configured to receive the supply voltage $V_{DD}$ and the first and second pump clock signals CLK and CLKB at each of the two stages. The pump circuit 202 can include N-type triple-well transistors as the first through tenth transistors 241-250. Triple-well transistors are desirable due to their low threshold voltage Vt. Alternatively, the pump circuit 202 can include other types of transistors, including P-type transistors, as one or more of the first through tenth transistors 241-250.

The first stage includes first through fifth transistors 241-245. The first transistor 241 is diode-connected between the power supply input $V_{DD}$ and a first node N11. In alternative embodiments, the gate of the first transistor 241 can be connected to be driven by an enable signal in order to allow for control of enabling and disabling of the first stage of the pump 202. The second transistor 242 is diode-connected between the first node N11 and a second node N12. The third transistor 243 is diode-connected between the second node N12 and a third node N13. The fourth transistor 244 is diode-connected between the third node N13 and a fourth node N14. The fifth transistor 245 is diode-connected between the fourth node N14 and an output node N15.

The second stage includes sixth through tenth transistors 246-250. The sixth transistor 246 is diode-connected between the power supply input $V_{DD}$ and a sixth node N21. In alternative embodiments, the gate of the sixth transistor 246 can be connected to be driven by an enable signal in order to allow for control of enabling and disabling of the second stage of the pump 202. The seventh transistor 247 is diode-connected between the sixth node N21 and a seventh node N22. The eighth transistor 248 is diode-connected between the seventh node N22 and an eighth node N23. The ninth transistor 249 is diode-connected between the eighth node N23 and a ninth node N24. The tenth transistor 250 is diode-connected between the ninth node N24 and the output node N15.

The output node N15 is in communication with the output terminal $V_{PUMP}$.

The first through eighth capacitors 251-258 are charged according to the first and second pump clock signals CLK and CLKB. Inverters 261-266 allow for desired timing and drive ability for charging the capacitors 251-258 and generating the pumping voltage $V_{PUMP}$. The second stage includes more inverters than the first stage, so the second stage includes a greater delay than the first stage. However, the number and placement of the inverters can vary for alternative embodiments, for example according to the desired timing for charging and discharging the capacitors 251-258.

During operation, the supply voltage $V_{DD}$ is applied and the first through eight capacitors 251-258 are charged according to the first and second pump clock signals CLK and CLKB having opposite phases, respectively, so that the voltage of the respective node is raised. In other words, the first, third, fifth, and seventh capacitors 251, 253, 255, and 257 are charged according to the first clock signal CLK, so that the first, third, sixth, and eighth nodes N11, N13, N21, and N23 are raised to a given voltage. Note, however, that the fifth and seventh capacitors 255 and 257 of the second stage are charged after a delay relative to the charging of the first and third capacitors 251 and 253 of the first stage due to the extra inverter 264. Further, the second, fourth, sixth, and eighth capacitors 252, 254, 256, and 258 are charged according to the second pump clock signal CLKB, so that the second, fourth, seventh, and ninth nodes N12, N14, N22, and N24 are raised to a given voltage. Note again that the sixth and eighth capacitors 256 and 258 are charged after a delay relative to the charging of the second and fourth capacitors 252 and 254 due to the extra inverter 266. The raised voltages of the respective nodes is transferred (except for voltage drops due to Vt of the transistors) through the first through fifth transistors 241-245 that are diode-connected and through the sixth through tenth transistors 246-250 that are diode-connected. Thus, the voltage level of the output terminal $V_{PUMP}$ increases to a given voltage, which is determined by the supply voltage $V_{DD}$ and the number and capacity of the capacitors 251-258.

In alternative embodiments, other types of known pump or boost circuits can be used as the pump circuit 202. For example, while a 2-phase pump is shown, alternative embodiments can include a 4-phase pump or even a 1-phase pump.

Figure 8:
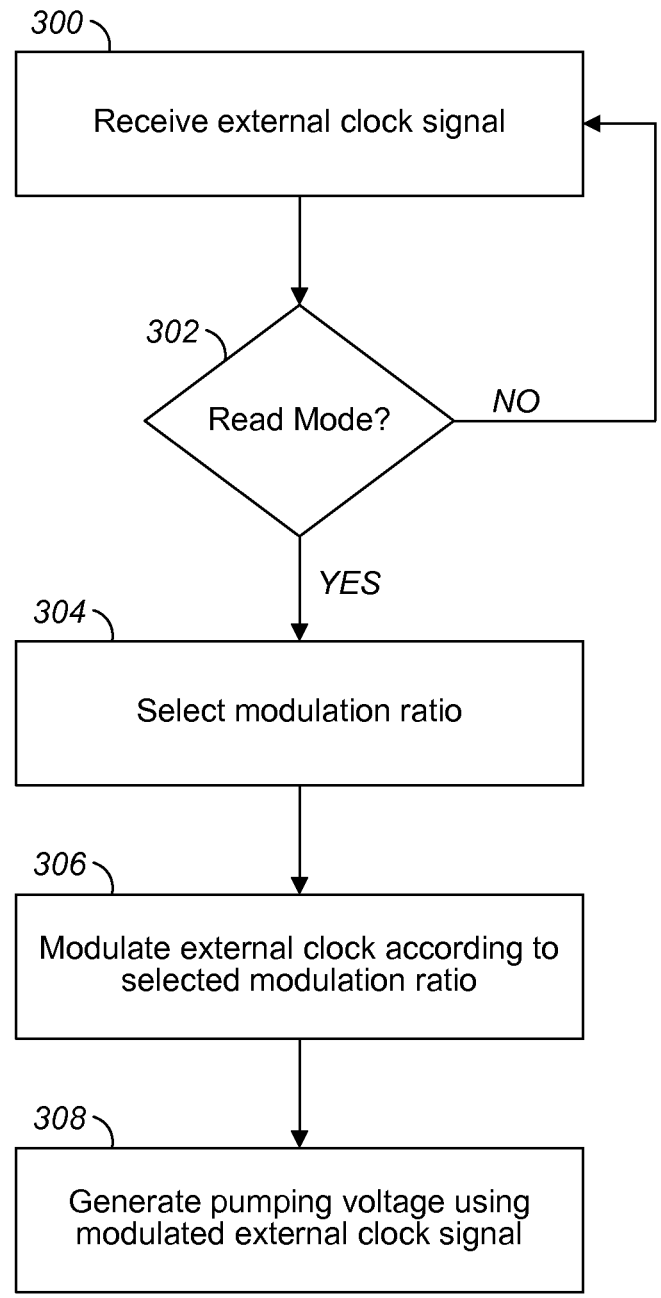
FIG. 8 shows a flowchart of a voltage pumping process according to the present disclosure.

FIG. 8 shows a flowchart of a voltage pumping method according to the present disclosure. The present voltage pumping method can be performed by embodiments of the integrated circuit 200. First, at block 300, circuitry within an integrated circuit receives a clock signal from a source external to integrated circuit. Next, at block 302, a decision is made as to whether the external clock circuit is desired. For example, in embodiments where the integrated circuit 200 is a flash memory, the progress depends on whether the read mode is presently enabled. If the result at block 302 is "Yes", the process continues to block 304; otherwise, the process returns to block 300. At block 304, a modulation ratio is selected from among a plurality of modulation ratios. Next, at block 306, the received external clock signal is modulated according to the modulation ratio selected at block 304, thereby providing a modulated clock signal. More specifically, at block 306 the frequency of the received external clock signal is divided, multiplied, or kept the same depending on the modulation ratio selected at block 304. Also, block 306 can include providing a complementary modulated clock signal that is an inverted version of the modulated clock signal. Finally, at block 308, a pumping voltage is generated using the modulated clock signal produced at block 306.

The detailed operation principle of the voltage pumping method disclosed herein has been described in connection with the above embodiments of the integrated circuit 200 and therefore is not repeated hereinafter.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method of generating a pumping voltage in an integrated circuit, the integrated circuit defined by a pump circuit and a modulating circuit having a clock modulator and a clock buffer, the method comprising:
receiving, at the clock modulator, an external clock signal from outside of the integrated circuit;
changing, at the clock modulator and based on an analog voltage level of a selection signal, a frequency of the received external clock signal, thereby providing a first modulated external clock signal;
determining, at the clock buffer, whether to use the first modulated external clock signal as a first pump clock signal;
charging a first capacitor of the pump circuit using the first pump clock signal; and
generating, at the pump circuit, the pumping voltage using the charged first capacitor, wherein
the receiving, changing, determining, charging, and generating are performed within the integrated circuit defined by the pump circuit and the modulating circuit,
the determining whether to use the first modulated external clock signal includes receiving the first modulated external clock signal at a logic gate that receives a plurality of logic input signals, and
the logic gate includes at least three inputs that receive the plurality of logic input signals.

2. The method of claim 1, wherein the changing of the frequency of the received external clock signal includes modulating the external clock signal according to a predetermined modulation ratio.

3. The method of claim 1, wherein the determining of whether to use the first modulated external clock signal as the first pump clock signal includes selecting from among a plurality of signals, wherein the plurality of signals includes the first modulated external clock signal.

4. The method of claim 3, wherein the plurality of signals includes the external clock signal.

5. The method of claim 3, wherein the plurality of signals includes a second modulated external clock signal.

6. The method of claim 1, further comprising charging a second capacitor using a second pump clock signal, wherein the first and second pump clock signals are complementary signals.

7. The method of claim 1, further comprising determining whether to enable the charging of the first capacitor based on whether a read operation is to be performed.

8. A method of generating a pumping voltage in an integrated circuit, the integrated circuit defined by a pump circuit and a modulating circuit having a clock modulator and a clock buffer, the method comprising:
receiving, at the clock modulator, an external clock signal from outside of the integrated circuit;
changing, at the clock modulator, a frequency of the received external clock signal, thereby providing a first modulated external clock signal;
selecting, at the clock modulator and based on an analog voltage level of a selection signal, a first pump clock signal from a plurality of signals that includes the external clock signal and the first modulated external clock signal;
charging a first capacitor of the pump circuit using the first pump clock signal; and
generating, at the pump circuit, the pumping voltage using the charged first capacitor, wherein
the receiving, changing, selecting, charging, and generating are performed within the integrated circuit defined by the pump circuit and the modulating circuit,
the selecting the first pump clock signal includes receiving the first pump clock signal at a logic gate that receives a plurality of logic input signals, and
the logic gate includes at least three inputs that receive the plurality of logic input signals.

9. The method of claim 8, wherein the changing of the frequency of the received external clock signal includes modulating the external clock signal according to a first predetermined modulation ratio.

10. The method of claim 9, further comprising the changing of the frequency of the received external clock signal according to a second predetermined modulation ratio, thereby providing a second modulated external clock signal.

11. The method of claim 10, wherein the plurality of signals includes the second modulated external clock signal.

12. The method of claim 8, further comprising charging a second capacitor using a second pump clock signal, wherein the first and second pump clock signals are complementary signals.

13. The method of claim 8, further comprising determining whether to enable the charging of the first capacitor based on whether a read operation is to be performed.

14. A method of generating a pumping voltage in an integrated circuit, the integrated circuit defined by a pump circuit and a modulating circuit having a clock modulator and a clock buffer, the method comprising:
 receiving, at the clock modulator, an external clock signal from outside of the integrated circuit;
 changing, at the clock modulator, a frequency of the received external clock signal to provide a first modulated external clock signal having a first option frequency;
 changing, at the clock modulator, the frequency of the received external clock signal to provide a second modulated external clock signal having a second option frequency;
 selecting, at the clock modulator and based on an analog voltage level of a selection signal, a first pump clock signal from a plurality of signals that includes the first modulated external clock signal and the second modulated external clock signal;
 charging a first capacitor of the pump circuit using the first pump clock signal; and
 generating, at the pump circuit, the pumping voltage using the charged first capacitor, wherein
 the receiving, changing, selecting, charging, and generating are performed within the integrated circuit defined by the pump circuit and the modulating circuit,
 the selecting the first pump clock signal includes receiving the first pump clock signal at a logic gate that receives a plurality of logic input signals, and
 the logic gate includes at least three inputs that receive the plurality of logic input signals.

15. The method of claim 14, wherein the changing of the frequency of the received external clock signal to provide the first modulated external clock signal includes modulating the external clock signal according to a first predetermined modulation ratio.

16. The method of claim 15, wherein the changing of the frequency of the received external clock signal to provide the second modulated external clock signal includes modulating the external clock signal according to a second predetermined modulation ratio.

17. The method of claim 14, wherein the plurality of signals includes the external clock signal.

18. The method of claim 14, further comprising charging a second capacitor using a second pump clock signal, wherein the first and second pump clock signals are complementary signals.

19. The method of claim 14, further comprising determining whether to enable the charging of the first capacitor based on whether a read operation is to be performed.

20. The method of claim 1, further comprising:
 receiving, at the clock modulator, a first control signal;
 receiving, at the clock buffer, a second clock signal; and
 outputting, from the clock buffer, complementary signals.

21. The method of claim 8, further comprising:
 receiving, at the clock modulator, a first control signal;
 receiving, at the clock buffer, a second clock signal; and
 outputting, from the clock buffer, complementary signals.

22. The method of claim 14, further comprising:
 receiving, at the clock modulator, a first control signal;
 receiving, at the clock buffer, a second clock signal; and
 outputting, from the clock buffer, complementary signals.

23. The method of claim 1, further comprising:
 determining, at the clock modulator, whether a read mode is enabled; and
 when the read mode is not enabled, repeating the receiving the external clock signal from outside of the integrated circuit until the read mode is enabled.

24. The method of claim 8, further comprising:
 determining, at the clock modulator, whether a read mode is enabled; and
 when the read mode is not enabled, repeating the receiving the external clock signal from outside of the integrated circuit until the read mode is enabled.

25. The method of claim 14, further comprising:
 determining, at the clock modulator, whether a read mode is enabled; and
 when the read mode is not enabled, repeating the receiving the external clock signal from outside of the integrated circuit until the read mode is enabled.

26. The method of claim 1, wherein an output of the logic gate is operably coupled to a timing buffer.

27. The method of claim 1, wherein the determining whether to use the first modulated external clock signal includes performing a logic operation.

28. The method of claim 1, wherein a frequency of the first modulated external clock signal is greater than the frequency of the received external clock signal.

* * * * *